US006295822B1

(12) United States Patent
Mueller

(10) Patent No.: US 6,295,822 B1
(45) Date of Patent: Oct. 2, 2001

(54) AIRCRAFT AIR-CONDITIONING APPARATUS WITH WATER SEPARATORS

(75) Inventor: Wolfgang Mueller, Beckdorf (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/627,575

(22) Filed: Jul. 28, 2000

(30) Foreign Application Priority Data

Aug. 4, 1999 (DE) ........................................ 199 36 641

(51) Int. Cl.[7] ............................ F28B 9/00; F25D 9/00
(52) U.S. Cl. ............................ 62/172; 62/87; 62/402
(58) Field of Search ............................ 62/172, 87, 402

(56) References Cited

U.S. PATENT DOCUMENTS 5,918,472 * 7/1999 Jonqueres .......................... 62/402 X
5,921,093 * 7/1999 Jonqueres .............................. 62/87
6,128,909 * 10/2000 Jonqueres .............................. 62/87

* cited by examiner

*Primary Examiner*—William Wayner
(74) *Attorney, Agent, or Firm*—W. F. Fasse; W. G. Fasse

(57) ABSTRACT

A system for air-conditioning the cabin of a passenger aircraft using externally provided fresh air as well as bleed air tapped from the engine of the aircraft includes at least one heat exchanger (4, 5), a blower (7), a compressor (8), an expansion turbine (9), a condenser (11), a reheater (10), a first high pressure water separator (13), and a second low pressure water separator (12). The several components are connected to each other by air lines such as air ducts, with control valves interposed therein. Two separate air-flow paths representing two different sub-systems are formed. A first air-flow path uses the high pressure water separator while a second air-flow path uses the low pressure water separator. These two air-flow paths or sub-systems can be operated separately and independently of each other by appropriately switching respective shut-off valves. In this manner, the operation of the air-conditioning system can be adaptively switched to achieve an optimal operation under different operating conditions of the aircraft and different air-conditioning requirements.

17 Claims, 4 Drawing Sheets

AIRCRAFT AIR-CONDITIONING APPARATUS WITH WATER SEPARATORS

PRIORITY CLAIM

This application is based on and claims the priority under 35 U.S.C. §119 of German Patent Application 199 36 641.1, filed on Aug. 4, 1999, the entire disclosure of which is incorporated herein by reference.

FIELD OF THE INVENTION

The invention relates to an apparatus for air-conditioning the cabin of a passenger aircraft using externally supplied fresh air as well as bleed air from an engine of the aircraft. Such an air-conditioning apparatus includes at least one heat exchanger, a blower, a compressor, an expansion turbine, a condenser, at least one water separator, and a reheater.

BACKGROUND INFORMATION

Air-conditioning plants or packs of the above described general type for cabin air-conditioning systems of passenger aircraft are generally known as such. They prepare and provide a stream of fresh air, to which typically a flow of so-called recirculation air is mixed, in order to adjust the temperature and the air flow velocity of the prepared mixed ventilation air in such a manner so as to achieve the greatest comfort for the occupants of the aircraft. The provision of recirculation air also reduces the required amount of fresh air or bleed air and thereby reduces the overall energy requirements. The recirculation air is typically used cabin air that is recycled and then used again. In this manner, a fresh air volume flow is constantly provided into the pressurized fuselage, while the aircraft is operating on the ground as well as during flight, so as to ensure proper ventilation of the cabin, the cockpit, the electronic bays as well as the freight compartments, and particularly to ensure a constant good air quality in the cabin and in the cockpit.

The conventional air-conditioning packs typically used for this purpose constantly develop and provide the maximum achievable cooling power or cooling capacity. Thereby, the maximum possible quantity of water is continuously removed from the air, in order to reduce or completely prevent the occurrence of icing at the outlet of the expansion turbine of the air-conditioning pack or plant. Thereby, it is possible to reduce the quantity of bleed air that must be tapped from the engine, which would appear at first to reduce the fuel consumption of the engine. Nonetheless, the disadvantage of such a conventional system is that it requires a comparatively large heat exchanger capacity in order to cool the air upstream of the expansion turbine and to remove the water that is contained in the air. The air flow resistance arising in the system due to such heat exchangers make it necessary to use a relatively high bleed air pressure to achieve an adequate air flow, which in turn requires relatively high engine rotational speeds or requires the bleed air to be tapped from a higher compressor stage, i.e. a compressor stage having higher pressure, of the engine. This in turn ultimately leads to an increase in the fuel consumption. Considered alternatively, if the fuel consumption is maintained the same, then a comparatively small fresh air quantity would be available for use in the air-conditioning system. In any event, there is a disadvantageous balance between the fuel consumption and the available fresh air quantity.

SUMMARY OF THE INVENTION

In view of the above, it is an object of the invention to provide an air-conditioning arrangement of the general type mentioned above, which is improved in such a manner so that it can achieve the maximum system power or capacity on the one hand, and minimize the fuel consumption on the other hand, while utilizing the lowest possible bleed air pressure. Another object of the invention is to provide such an air-conditioning system that can be operated in different modes depending on the respective existing operating condition of the aircraft and the air-conditioning demands at any given time, so as to allow the performance and the economy of operation of the air-conditioning system to be adapted or optimized for different operating situations of the aircraft. The invention further aims to avoid or overcome the disadvantages of the prior art, and to achieve additional advantages, as are apparent from the present specification.

The above objects have been achieved in an aircraft air-conditioning apparatus according to the invention, including a heat exchanger, a blower, a compressor, an expansion turbine, a condenser, a reheater, a first high pressure water separator, a second low pressure water separator, respective air lines connecting together the several above mentioned components, and shut-off valves interposed in respective air lines to control the operation of the system. More particularly, the first high pressure water separator is arranged in a first air flow path formed by respective components and air lines, and the second low pressure water separator is arranged in a second air flow path formed by respective components and air lines. The two air flow paths can be separated from each other by appropriately switching the shut-off valves. Namely, the shut-off valves can be switched to respectively alternatively switch the air-flow through the first air flow path with the first high pressure water separator or through the second air flow path with the second low pressure water separator. Throughout this specification, the general term "air line" encompasses all possible lines through which air may flow, such as ducts, conduits, pipes, hoses, channels, and passages, for example. The water separators can be any conventionally known water separators, whereby the high pressure water separator is adapted to operate at a relatively higher air pressure (e.g. upstream of the expansion turbine), while the low pressure water separator is adapted to operate at a relatively lower air pressure (e.g. downstream of the expansion turbine).

With such an arrangement, the apparatus according to the invention advantageously combines two different types of air-conditioning sub-systems or circuits, and uses each one most efficiently during the optimum operating conditions therefor. Namely, the invention makes use of the advantages offered by an air-conditioning circuit using a high pressure water separator during operation on the ground or at relatively low flight altitudes. On the other hand, the apparatus also makes it possible to switch off portions of the air circuit of the air-conditioning pack or plant during periods of non-use, i.e. periods of operation in which the full air-conditioning capacity is not needed. Instead, during such operating conditions, a low pressure water separator is used in order to remove the water from the air as required and thereby maintain the proper operating function with low bleed air pressures, while the high pressure water separator and related components are switched out of the operating circuit.

Various detailed embodiments of the inventive apparatus minimize the number of necessary components and therewith the cost and the weight of the overall system, on the one hand, and also further increase the operating efficiency, on the other hand. Such preferred detail embodiments will be discussed below.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
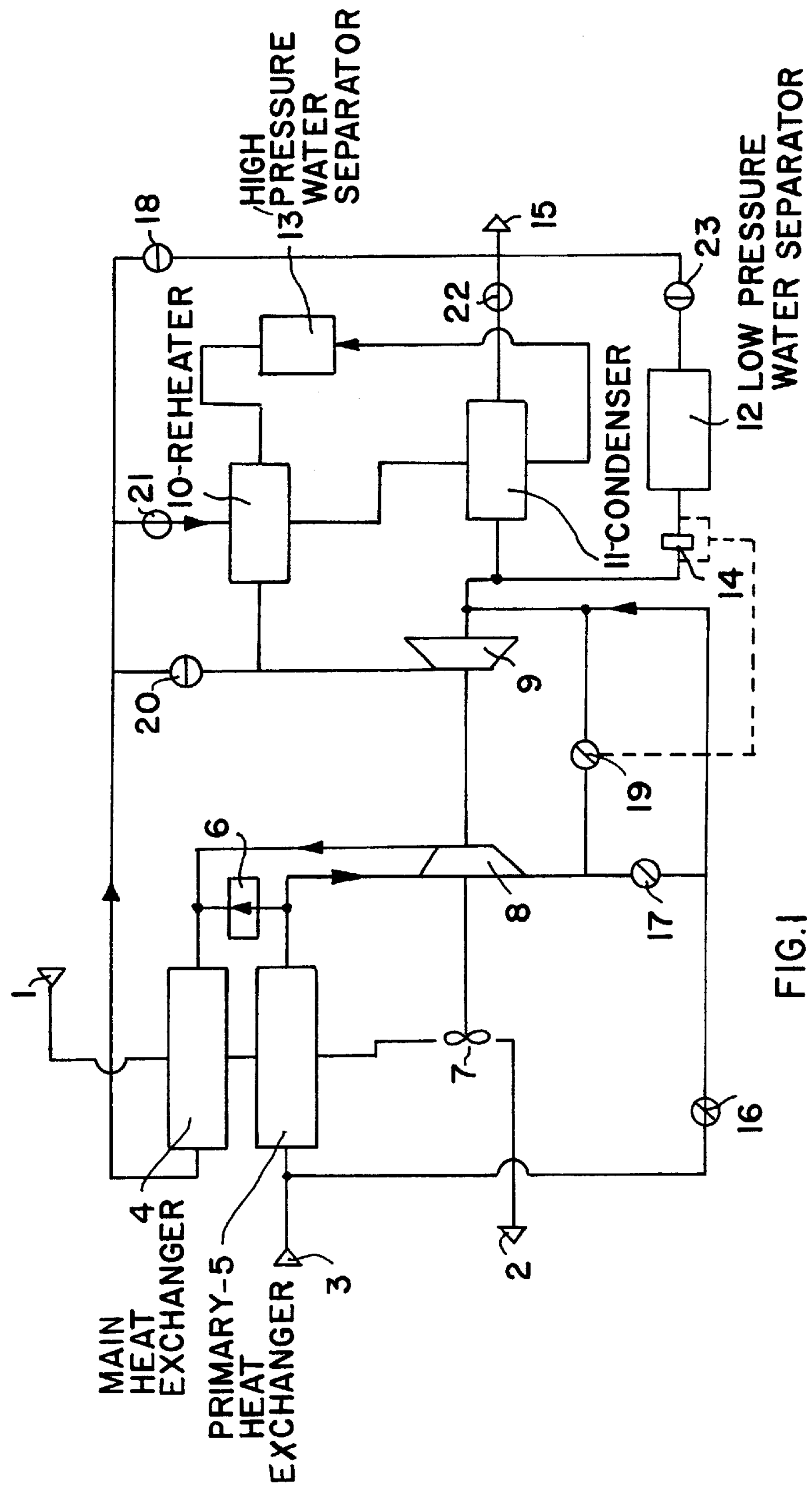
FIG. 1 is a schematic block circuit diagram of a first variant or embodiment of an air-conditioning system according to the invention.

The air-conditioning system shown schematically in FIG. 1 includes a ram air inlet 1 and outlet 2 for external fresh air that is provided in the form of ram air into the inlet 1. This air used for cooling hot bleed air in heat exchangers as will be discussed below. The air-conditioning system further includes a supply line 3 for hot bleed air that is tapped from the compressor of an engine (which is not shown in the drawings), as well as an air-conditioning system air outlet 15 from which is emitted the fresh air or mixed air provided by the air-conditioning system for the purpose of cabin air-conditioning in an aircraft. The mixing of bleed air and recirculation air is not expressly shown, but can be carried out in any conventional manner.

Connected in circuit downstream of the ram air inlet 1 are a main heat exchanger 4 and a so-called primary heat exchanger 5, which simultaneously also receives the engine bleed air from the bleed air supply line 3, for heat exchange between the bleed air and the ram air. A connection line is connected between the bleed air lines of the two heat exchangers 4 and 5, and a first valve 6 is interposed in this connection line. The operation of the first valve 6 will be discussed below. Throughout the drawings, the air flow through any component is schematically regarded as continuing in a straight line through the component. Thus, in the various heat exchange devices, two separate air flows pass through the respective device without intermixing but while being in thermal heat exchange with each other.

The air-conditioning system further includes an air cycle machine comprising a blower 7, a compressor 8, and an expansion turbine 9, which are all arranged together on a common rotatable shaft. The blower 7 of the air cycle machine is connected to one outlet of the primary heat exchanger 5, and particularly in the ram air circuit from the ram air inlet 1 to the outlet 2. The second (bleed air) outlet of the primary heat exchanger 5 is connected to the inlet of the compressor 8, and in turn the outlet of the compressor 8 is connected to the (bleed air) inlet of the main heat exchanger 4. The first valve 6 mentioned above forms a selective bypass or shunt between the inlet and the outlet of the compressor 8, and simultaneously between the second (bleed air) outlet of the primary heat exchanger 5 and the (bleed air) inlet of the main heat exchanger 4 that is connected to the outlet of the compressor 8.

The connections at the other working end of the air cycle machine, i.e. at the turbine 9, are as follows. The inlet of the expansion turbine 9 is connected to an outlet of a reheater 10, while the outlet of the turbine 9 branches off to a condenser 11 on the one hand, and to a low pressure water separator 12 on the other hand. A high pressure water separator 13 is connected in circuit between the reheater 10 and the condenser 11. A so-called anti-icing grill 14 is arranged between the outlet of the turbine 9 and the low pressure water separator 12. Both the outlet of the condenser 11 as well as the outlet of the low pressure water separator 12 join together to discharge out through the air-conditioning system air outlet 15 which provides the air-conditioning air prepared by the air-conditioning system for carrying out the cabin air-conditioning.

Throughout the above description, it should be understood that the respective inlets and outlets of the various components are connected by any suitable air lines such as hoses, pipes, ducts, channels, conduits, etc. Moreover, several valves are interposed at different locations in the various connecting air lines respectively between the above described components. Particularly, an anti-icing valve 16 is interposed in a connecting line between the bleed air inlet 3 and the outlet of the turbine 9. A first bypass valve 17 is connected between the anti-icing valve 16 and the outlet of the primary heat exchanger 5, for example through or at the inlet of the compressor 8. Further valves include a second bypass valve 18 that provides high pressure bleed air from the main heat exchanger 4 directly to the system air outlet 15, a turbine circumventing or bypassing valve 19, and four shut-off valves 20, 21, 22 and 23. The particular connections and operation of these several valves will be described in greater detail below.

In this arrangement, the turbine circumventing or bypassing valve 19 serves to regulate the outlet temperature of the expansion turbine 9. Due to a low temperature prevailing at the outlet of the turbine 9, and particularly in the air flowing through the anti-icing grill 14, ice begins to form on the anti-icing grill 14, depending on the moisture content and temperature of the airflow. Due to the accumulating ice on the anti-icing grill 14, which tends to block the air flow passages therethrough, a pressure differential develops across the anti-icing grill 14 This pressure differential is sensed or measured by any appropriate pressure difference measuring device, well known in the art, which in turn is used to actuate the turbine circumventing or bypassing valve 19, as indicated by dashed lines in FIG. 1. Thus, depending on the degree of ice accumulation on the anti-icing grill 14, the turbine circumventing valve 19 is automatically operated in a self-regulating manner to regulate the outlet temperature of the expansion turbine 9 by shunting hot or warm bleed air past the turbine directly to the outlet of the turbine.

During ground operation of the aircraft or at low flight altitudes, i.e. when a high cooling capacity is required and simultaneously a high air moisture content or humidity prevails in the ambient surrounding exterior air, the shut-off valves 20 and 23 as well as the turbine circumventing or bypassing valve 19 are closed, while the shut-off valves 21 and 22 are opened. In this switching arrangement, as illustrated in FIG. 1, the incoming air that is to be cooled is directed through the generally conventional basic air-conditioning system using the high pressure water separator 13. Namely, the compressed and cooled bleed air provided by the air delivery arrangement (e.g. the bleed air inlet 3, heat exchangers 4 and 5, and the compressor 8) is routed through a first air supply path (including in sequence the reheater 10, the condenser 11, the high pressure water separator 13, and the other heat exchange passages of the reheater 10) to the turbine 9, and from the turbine 9 through a first air outlet path (including the other heat exchange passages of the condenser 11) to the system air outlet 15.

On the other hand, a different circuit arrangement is achieved by a different switching pattern of the valves, for example when the maximum cooling capacity of the system is not required. Namely, by opening the valve 20 between the air delivery arrangement and the inlet of the expansion turbine 9 as well as the valve 23 downstream of the low pressure water separator 12, while simultaneously closing the valve 21 between the outlet of the main heat exchanger 4 and the inlet of the reheater 10 as well as the valve 22 at the outlet of the condenser 11, the airflow to be cooled will be directed through the cooling system in such a manner that it flows through a second air supply path (including the valve 20 therein) substantially directly to the expansion turbine 9, and from there through a second air outlet path including the low pressure water separator 12, without passing through the reheater 10, the condenser 11, and the high pressure water separator 13. This achieves the advantage of maintaining the proper operating functionality of the system with low bleed air pressures.

While the just-mentioned operation could be achieved by a system that includes only a low pressure water separator, the present inventive system achieves the combined advantages of a first sub-system with a high pressure water separator and a second sub-system with a low pressure water separator. Each of these combined sub-systems in the present arrangement can be operated completely separately and independently of one another, by appropriate operation of the above described valves, and therefore these two sub-systems may also be regulated completely independently of each other. Thus, the optimal operation of each sub-system can be utilized and adapted to the operating conditions and cooling requirements of the aircraft, for which the respective sub-system is best suited.

As a variant of the embodiment of FIG. 1, the two shut-off valves 20 and 21 could be replaced by a single three-port switching valve connected between the air delivery arrangement, the first air supply path and the second air supply path, or connected between the turbine inlet, the first air supply path and the second air supply path. Also the two shut-off valves 22 and 23 could be replaced by a single three-port switching valve connected between the turbine outlet, the first air outlet path and the second air outlet path, or connected between the first air outlet path, the second air outlet path and the system air outlet.

Figure 2:
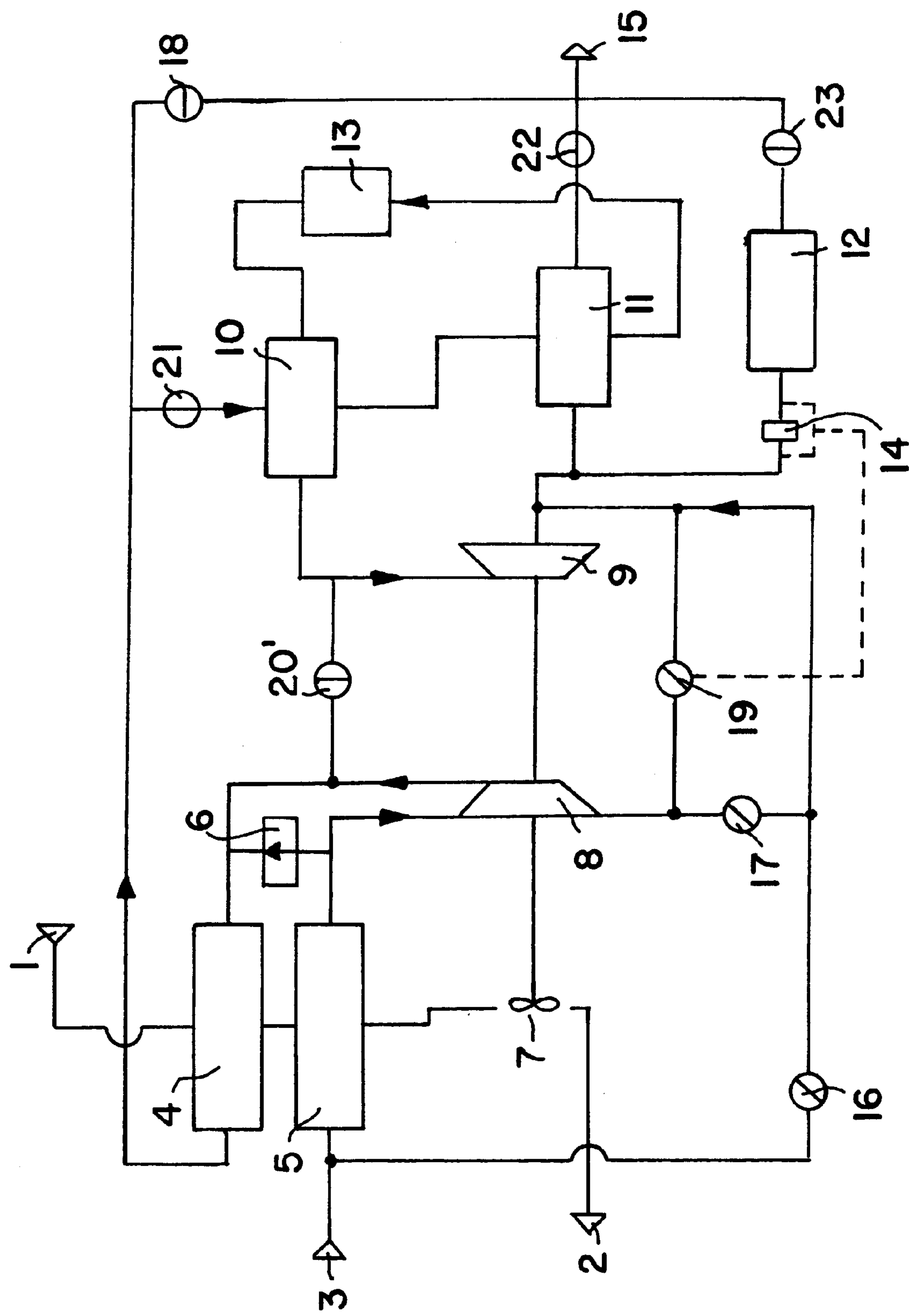
FIG. 2 is a schematic block circuit diagram of a second variant or embodiment of an air-conditioning system according to the invention.

FIG. 2 shows a second embodiment of an air-conditioning system according to the invention. The air-conditioning system according to FIG. 2 is otherwise identical to the above described system according to FIG. 1, except that the connection of the shut-off valve 20 of FIG. 1 has been changed to provide a shut-off valve 20' according to FIG. 2. Basically, one side of the shut-off valve 20' remains connected between the reheater 10 and the inlet of the expansion turbine 9, just as the valve 20 of FIG. 1. However, the other side of the valve 20' is connected to the air line that connects from the outlet of the compressor 8 to the main heat exchanger 4, rather than being connected to the air line downstream of the main heat exchanger 4 as is the valve 20 of FIG. 1. In other words, the valve 20' is connected between the outlet of the compressor 8 and the inlet of the turbine 9. Thus, while the operation of the system according to FIG. 2 otherwise remains the same as that according to FIG. 1, a pressure drop across the main heat exchanger 4 is avoided, and more pressure will be available at the input of the turbine 9 for carrying out the expansion through the turbine 9. Also, the air provided to the turbine 9 through the valve 20' will be hotter than the air provided to the turbine 9 through the valve 20 in the embodiment of FIG. 1. Of course, these differences only apply when the system is switched to the operating mode in which the valve 20' is open, namely the mode making use of the low pressure water separator 12 and not using the reheater 10, the condenser 11, and the high pressure water separator 13.

Figure 3:
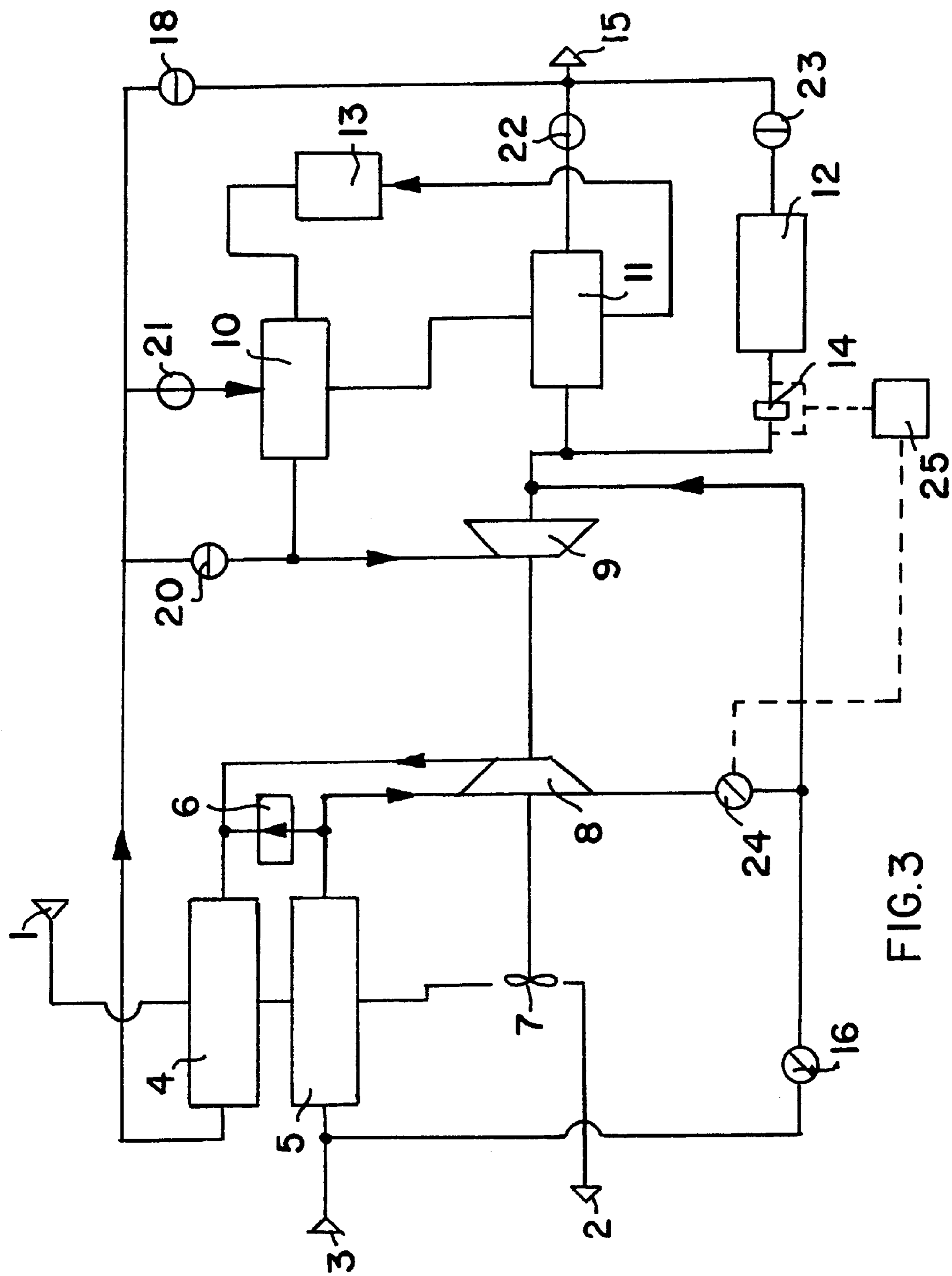
FIG. 3 is a schematic block circuit diagram of a third variant or embodiment of an air-conditioning system according to the invention.

FIG. 3 schematically shows a third embodiment of the inventive system, which is essentially identical to the embodiment of FIG. 1, except that it omits the bypass valve 17 and the turbine circumventing valve 19, and instead uses a combined valve 24, of which the operation is controlled by a signal converter 25 which is connected to the anti-icing grill 14. Particularly, the signal converter 25 detects the pressure difference arising across the anti-icing grill 14, and responsively actuates and controls the combined valve 24 in an electrical or pneumatic manner, for example. Thereby, it is possible to generate the signal resulting from and responsive to the pressure difference across the anti-icing grill 14 either electrically or pneumatically. The combined valve 24 is operated in an automatic or self-regulating manner to control the operation of the expansion turbine 9 and the mutually connected compressor 8, responsive to the degree of icing that occurs on the anti-icing grill 14. It should further be noted that the features of the alternative embodiment of FIG. 2 can also be incorporated in the embodiment of FIG. 3. Such a combination of features is generally possible among any or all the separate embodiments described herein.

Figure 4:
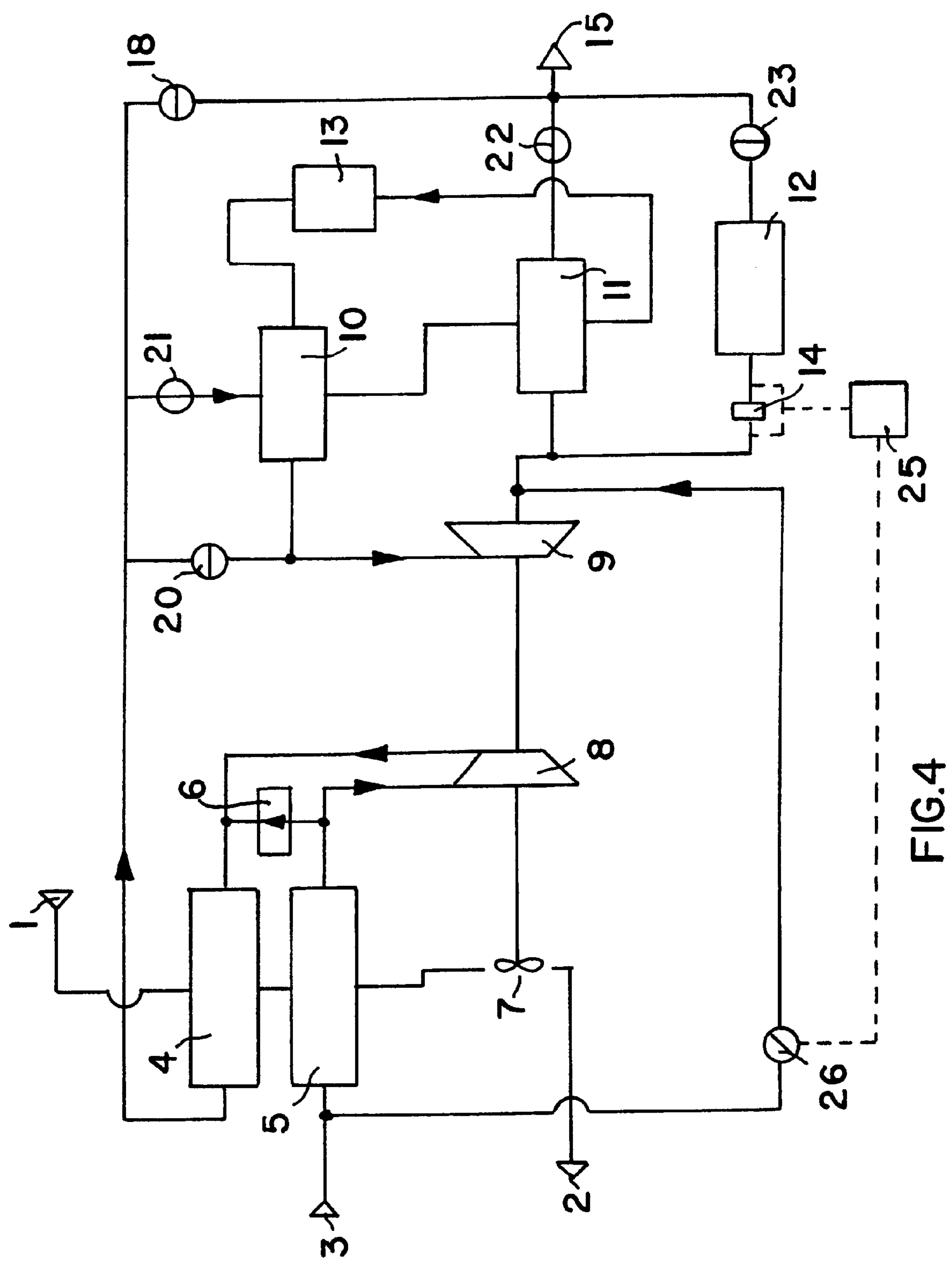
FIG. 4 is a schematic block circuit diagram of a fourth variant or embodiment of an air-conditioning system according to the invention.

A further varied fourth embodiment is shown schematically in FIG. 4. This fourth embodiment in principle corresponds to that shown in FIG. 1, or alternatively could correspond to that shown in FIG. 2, except that the fourth embodiment uses a single combined valve 26 instead of the three individual valves 16, 17 and 19 in the embodiments of FIGS. 1 and 2. This combined valve 26 is actuatable in an electrical or pneumatic manner from a signal converter 25, which is connected and which operates in a manner similar to that described above in connection with FIG. 3. Thus, the operation of the combined valve 26 is carried out in a self-regulating manner responsive to the degree of icing that occurs on the anti-icing grill 14. One advantage of this fourth embodiment is that the total number of components has been reduced by at least two valves. Moreover, an even more important advantage is that the air being branched or shunted through the combined valve 26 is taken from a point directly upstream of the primary heat exchanger 5, i.e. essentially directly from the engine bleed air supply line 3. Thereby, warmer air is used and delivered through the combined valve 26 to a point downstream of the outlet of the expansion turbine 9, so that the total air quantities to be regulated thereby are smaller. In other words, since warmer air is used for the regulation, a smaller air quantity is required to achieve a particular regulating effect.

The inventive air-conditioning system thus successfully and effectively combines two distinct sub-systems, which can each operate optimally and independently of the other, without any limitations or negative influences of one sub-system on the other. In other words, all of the necessary functions are maintained for operating according to both modes or types of air-conditioning systems, namely such systems using a high pressure water separator on the one hand, and such systems using a low pressure water separator on the other hand, while providing a reliable function of the overall system under all operating conditions. Thereby, the operation of the overall system can be adapted and optimized to the particular operating condition at hand.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An air-conditioning system for air-conditioning a cabin of a passenger aircraft, comprising:

an air delivery arrangement including an engine bleed air inlet and a compressor;

an expansion turbine including a turbine inlet and a turbine outlet;

a first air supply path that includes a first high pressure water separator interposed therein and that communicates from said air delivery arrangement to said turbine inlet;

a second air supply path that communicate s from said air delivery arrangement to said turbine inlet;

a system air outlet adapted to provide air-conditioned air for air-conditioning the cabin of the aircraft;

a first air outlet path that communicates from said turbine outlet to said system air outlet;

a second air outlet path that includes a second low pressure water separator interposed therein and that communicates from said turbine outlet to said system air outlet; and a valve arrangement that is interposed in said first air supply path, said second air supply path, said first air outlet path, and said second air outlet path, and that is adapted to direct an airflow selectively from said air delivery arrangement through said first air supply path, said turbine and said first air outlet path to said system air outlet and alternatively selectively from said air delivery arrangement through said second air supply path, said turbine and said second air outlet path to said system air outlet.

2. The air-conditioning system according to claim 1, wherein said air delivery arrangement further includes a fresh cooling air circuit comprising at least one heat exchanger and at least one blower connected between a cooling air inlet and a cooling air outlet;

wherein said at least one heat exchanger is also interposed between said engine bleed air inlet and said first and second air supply paths; and wherein said first air supply path further includes a reheater and a condenser connected in series with said first high pressure water separator.

3. The air-conditioning system according to claim 1, wherein said second air outlet path further includes an anti-icing grill interposed between said turbine outlet and said second low pressure water separator.

4. The air-conditioning system according to claim 3, further comprising a differential pressure sensor arrangement connected and adapted to sense a differential pressure existing across said anti-icing grill.

5. The air-conditioning system according to claim 4, further comprising a turbine circumventing valve (19) that is connected between a compressor inlet of said compressor and said turbine outlet, and that is connected to receive a valve actuation signal from said differential pressure sensor arrangement to enable actuation of said turbine circumventing valve responsive to said differential pressure.

6. The air-conditioning system according to claim 5, wherein said turbine circumventing valve (19) is connected directly between said compressor inlet and said turbine outlet and is not connected and interposed between said compressor inlet and said engine bleed air inlet, and further comprising a bypass valve connected and interposed between said compressor inlet and said engine bleed air inlet.

7. The air-conditioning system according to claim 4, further comprising a combination valve (24) that has a first valve port connected to a compressor inlet of said compressor and a second valve port connected to said turbine outlet, and that is connected to receive a valve actuation signal from said differential pressure sensor arrangement to enable actuation of said combination valve responsive to said differential pressure.

8. The air-conditioning system according to claim 7, wherein said second valve port of said combination valve (24) is also connected to said engine bleed air inlet, and wherein said system does not further comprise an additional valve connected between said compressor inlet and said turbine outlet.

9. The air-conditioning system according to claim 4, further comprising a combination valve (26) that is connected between said engine bleed air inlet and said turbine outlet, and that is connected to receive a valve actuation signal from said differential pressure sensor arrangement to enable actuation of said combination valve responsive to said differential pressure.

10. The air-conditioning system according to claim 9, wherein said combination valve is not connected to a compressor inlet of said compressor, wherein said system does not further comprise an additional valve connected and interposed between said combination valve and said turbine outlet, and wherein said system does not further comprise an additional valve connected between said compressor inlet and said turbine outlet.

11. The air-conditioning system according to claim 4, wherein said differential pressure sensor arrangement comprises an electrical device adapted to emit an electrical signal responsive to said differential pressure.

12. The air-conditioning system according to claim 4, wherein said differential pressure sensor arrangement comprises a pneumatic device adapted to emit a pneumatic signal responsive to said differential pressure.

13. The air-conditioning system according to claim 1, wherein said valve arrangement comprises a first valve (21) interposed in said first air supply path between said air delivery arrangement and said turbine inlet, a second valve (20) interposed in said second air supply path between said air delivery arrangement and said turbine inlet, a third valve (22) interposed in said first air outlet path between said turbine outlet and said system air outlet, and a fourth valve (23) interposed in said second air outlet path between said turbine outlet and said system air outlet.

14. The air-conditioning system according to claim 1, wherein said valve arrangement comprises a first switching valve that is interposed and connected between said air delivery arrangement, said first air supply path and said second air supply path, and that has a single common inlet port connected to said air delivery arrangement, a first selectable outlet port connected to said first air supply path, and a second selectable outlet port connected to said second air supply path; and wherein said valve arrangement further comprises a second switching valve that is interposed and connected between said system air outlet, said first air outlet path and said second air outlet path, and that has a first selectable inlet port connected to said first air outlet path, a second selectable inlet port connected to said second air outlet path, and a single common outlet port connected to said system air outlet.

15. The air-conditioning system according to claim 1, wherein said valve arrangement comprises a first switching valve that is interposed and connected between said first air supply path, said second air supply path and said turbine inlet, and that has a single common outlet port connected to said turbine inlet, a first selectable inlet port connected to said first air supply path, and a second selectable inlet port connected to said second air supply path; and wherein said valve arrangement further comprises a second switching valve that is interposed and connected between said turbine outlet, said first air outlet path and said second air outlet path, and that has a first selectable outlet port connected to said first air outlet path, a second selectable outlet port connected to said second air outlet path, and a single common inlet port connected to said turbine outlet.

16. The air-conditioning system according to claim 1, wherein said first air supply path is connected directly from a compressor outlet of said compressor to said turbine inlet, and wherein said valve arrangement comprises a shut-off valve that is interposed in said first air supply path between said compressor outlet and said turbine inlet.

17. A method of using the air-conditioning system according to claim 1, comprising switching said valve arrangement so that air flows from said air delivery arrangement through said first air supply path, said turbine and said first air outlet path to said system air outlet during a first time period, and then switching said valve arrangement so that air flows from said air delivery arrangement through said second air supply path, said turbine and said second air outlet path to said system air outlet during a second time period.

* * * * *